F. L. WATTERS.
HANDLE BAR STEM.
APPLICATION FILED AUG. 17, 1908.
908,177.
Patented Dec. 29, 1908.
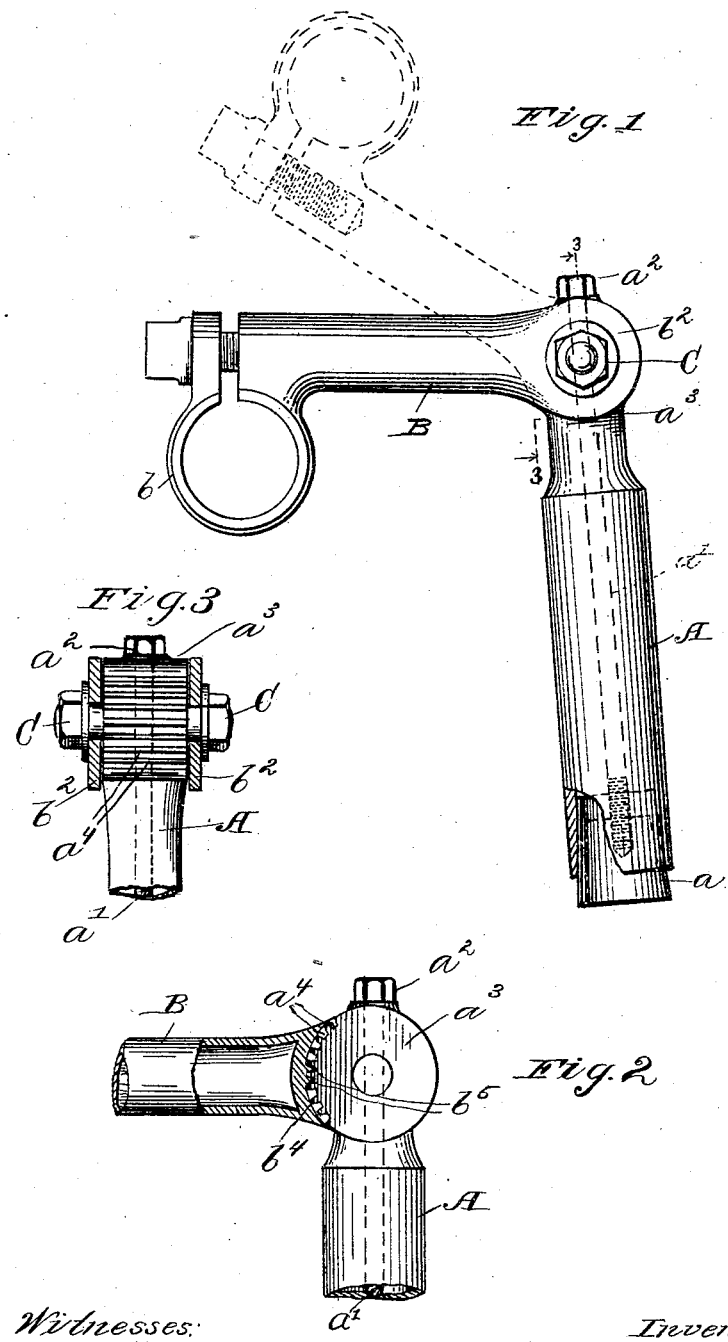

UNITED STATES PATENT OFFICE.

FREDERICK L. WATTERS, OF SHELBY, OHIO.

HANDLE-BAR STEM.

No. 908,177.  Specification of Letters Patent.  Patented Dec. 29, 1908.

Application filed August 17, 1908. Serial No. 448,991.

*To all whom it may concern:*

Be it known that I, FREDERICK L. WATTERS, citizen of the United States, resident of Shelby, county of Richland, and State of Ohio, have invented a new and useful Improvement in Handle-Bar Stems, of which the following is a specification, the principle of the invention being herein explained and the best mode in which I have contemplated applying that principle so as to distinguish it from other inventions.

My invention relates to improvements in handle bars for bicycles, and has more particular regard to the construction of the handle bar stem as the secondary post mounted in the upper end of the steering post is generally called.

The object of my invention is the improvement of the type of handle bar stem illustrated in United States Letters Patent, No. 561,329, which is characterized by means for securing the handle bar in any desired position without changing the distance between the handles thereon or necessarily varying their angle of inclination to the rider.

The object of the invention is the provision of a handle construction of this sort wherein the parts may be secured in their various adjusted positions with greater solidity and assurance of permanence than heretofore.

To the accomplishment of the above and related ends said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—Figure 1 is a side elevation of a handle-bar stem embodying my several improvements, one alternate position of the movable portion of the stem being shown in dotted outline; Fig. 2 is a partial side elevation and partial section of the joint constituting a feature of said stem's construction; and Fig. 3 is a partial transverse section and partial front elevation of such joint.

The type of handle bar stem to which my invention applies comprises a jointed handle-bar post, the lower member A of which is designed to fit within the front post (not shown) of the bicycle frame and to be clamped therein by a conical clamp member $a$, such member being drawn into the clamping position by means of a bolt $a'$ the head $a^2$ of which rests on the upper end or head $a^3$ of the stem, the lower end of which is threaded into the conical clamp member. The other member B of the stem is jointed, or pivotally secured, to the upper end $a^3$ of such first or post member, and is provided at its outer end with an integral clamp collar $b$ adapted to embrace the handle bar (not shown) which may be secured therein in any desired angular position, as will be readily understood.

It is to the construction of the joint for securing such movable member to the fixed stem member that particular attention is here directed. As shown in Figs. 2 and 3, the front face of head $a^3$ of the post or fixed stem member A is provided with transverse serrations $a^4$, such face being of general cylindrical contour. The corresponding end of the movable stem member B is bifurcated, its respective lateral portions $b^2$ embracing such cylindrical head and being secured thereto by set bolts C threaded in suitable apertures on opposite sides of the head aforesaid. The inner face $b^4$ of movable member B between such lateral portions or ears $b^2$ is of concave cylindrical form to correspond with the convex face of the head and bears preferably substantially centrally therein, one or more transverse ribs $b^5$, forming serrations complementary to the serrations on the head $a^3$ and adapted to interlock therewith. While two such ribs are shown, the number is obviously a matter of indifference.

The engaging faces of head $a^3$ and of movable member B being made to fit closely, it will be obvious that when they are joined together with these ribs in engagement with any particular serrations and the set bolts C turned in place, a very rigid connection between the two members of the post is had so that the rider can rest in absolute security, relying on the continued rigidity of the handle-bar stem. At the same time it is a very simple matter to release the upper member from the head in order to adjust it to a different angle, or turn it over, as shown in dotted outline in Fig. 1, by means of which the handle-bar proper may obviously be brought into any of the positions usually found desirable by cyclists.

Other modes of applying the principle of my invention may be employed instead of the one explained, change being made as regards the mechanism herein disclosed, provided the means stated by any one of the following claims or the equivalent of such stated means be employed.

I therefore particularly point out and distinctly claim as my invention:—

1. In a bicycle or the like, a jointed handle-bar stem, one member of said stem being adapted to be secured to the steering post of the bicycle, the other to bear the handle-bar, said first member having a substantially cylindrical head formed with serrations on its cylindrical face, and said second member having complementary serrations adapted to register with those on said head in various angular positions of said second member.

2. In a bicycle or the like, a jointed handle-bar stem, one member of said stem being adapted to be secured to the steering post of the bicycle, the other to bear the handle-bar, said first member having a substantially cylindrical head formed with transverse serrations on its cylindrical face, and said second member being bifurcated so as to laterally inclose said head and having complementary serrations adapted to register with those on said head in various angular positions of said second member.

3. In a bicycle or the like, a jointed handle-bar stem, one member of said stem being adapted to be secured to the steering post of the bicycle, the other to bear the handle-bar, said first member having a substantially cylindrical head formed with transverse serrations on the front portion of its cylindrical face, and said second member being bifurcated so as to laterally inclose said head and having a concave cylindrical portion provided with transverse ribs or teeth adapted to register with the serrations on said head in various angular positions of said second member; and set bolts for removably securing the lateral portions of said second member to said head.

Signed by me this 4th day of August, 1908.

FREDERICK L. WATTERS.

Attested by—
  C. S. WATTERS,
  J. H. BRACKNEY.